United States Patent
Grimmett

(10) Patent No.: US 10,518,746 B1
(45) Date of Patent: Dec. 31, 2019

(54) DETACHABLE TRAILER JACK LOCKING ASSEMBLY

(71) Applicant: Robert Grimmett, Cleveland, MS (US)

(72) Inventor: Robert Grimmett, Cleveland, MS (US)

( * ) Notice: Subject to any disclaimer, the term of this patent is extended or adjusted under 35 U.S.C. 154(b) by 54 days.

(21) Appl. No.: 15/829,336

(22) Filed: Dec. 1, 2017

(51) Int. Cl.
*B60R 25/00* (2013.01)
*E05B 17/14* (2006.01)
*B60D 1/60* (2006.01)
*E05B 67/38* (2006.01)
*E05B 1/04* (2006.01)

(52) U.S. Cl.
CPC ............ *B60R 25/001* (2013.01); *B60D 1/605* (2013.01); *E05B 1/04* (2013.01); *E05B 17/142* (2013.01); *E05B 67/383* (2013.01)

(58) Field of Classification Search
CPC ........ E05B 1/00; E05B 1/0053; E05B 1/0061; E05B 1/04; E05B 17/14; E05B 17/142; E05B 65/0014; B60R 25/001
See application file for complete search history.

(56) References Cited

U.S. PATENT DOCUMENTS

| | | | | |
|---|---|---|---|---|
| 1,358,681 A | * | 11/1920 | Parker | B60R 25/007 70/181 |
| 2,785,564 A | * | 3/1957 | Rossi | B62D 53/085 70/232 |
| 3,636,742 A | * | 1/1972 | Raney | A47G 29/10 70/424 |
| 4,538,434 A | * | 9/1985 | Janzen, Sr. | F16K 35/10 70/178 |
| 5,052,203 A | * | 10/1991 | Van Cuyk | B62D 53/085 70/232 |
| 5,136,863 A | * | 8/1992 | Richardson | B62D 53/085 70/14 |
| 5,412,962 A | * | 5/1995 | Thompson | F16K 35/10 109/20 |
| 5,782,115 A | * | 7/1998 | Judy | B60D 1/60 248/552 |
| 6,202,453 B1 | * | 3/2001 | Disher | B60D 1/60 280/507 |
| 6,244,614 B1 | * | 6/2001 | Bonvillain | B60D 1/60 280/507 |
| 6,434,982 B1 | | 8/2002 | Rowland | |
| 6,530,249 B1 | * | 3/2003 | Burkhead | B60D 1/06 280/507 |

(Continued)

*Primary Examiner* — Christopher J Boswell
(74) *Attorney, Agent, or Firm* — Smith & Hopen, P.A.; Paul Murty

(57) ABSTRACT

Trailer theft is a widespread problem, and existing locks have failed to solve the problem for a number of reasons. Some locks require permanent modification of a trailer jack, while others are easy to break into. The present invention provides a detachable trailer jack locking assembly including a retention shell couplable to a trailer jack body. The retention shell is sized and shaped to surmount an upper end of an outer tube of the trailer jack. The retention shell also includes a slot configured to accept a handle of a lifting assembly on the trailer jack. The assembly includes an attachment point disposed on the outer tube of the trailer jack. A lock is adapted to secure the retention shell against the outer tube by coupling with the attachment point. When engaged, the handle is immobilized within the slot, thereby rendering the lifting mechanism of the trailer jack inoperable.

18 Claims, 8 Drawing Sheets

(56) References Cited

U.S. PATENT DOCUMENTS

| | | |
|---|---|---|
| 6,598,432 B1 | 7/2003 | Dwyer |
| 6,606,887 B1 * | 8/2003 | Zimmer .............. E05B 73/0082 70/14 |
| 6,705,137 B2 | 3/2004 | Saladin et al. |
| 7,040,646 B2 | 5/2006 | Pare |
| 7,117,700 B2 * | 10/2006 | Smith ................... B60R 25/093 70/225 |
| 7,584,677 B1 | 9/2009 | Johnson et al. |
| 7,878,032 B1 * | 2/2011 | Gogel ..................... E05B 67/38 292/205 |
| 9,393,936 B1 | 7/2016 | Grote |
| D780,070 S | 2/2017 | Anderson |
| 10,017,019 B1 * | 7/2018 | Ludwig ................... B60D 1/60 |
| 2018/0194320 A1 * | 7/2018 | Witchey ................... B60S 9/04 |

\* cited by examiner

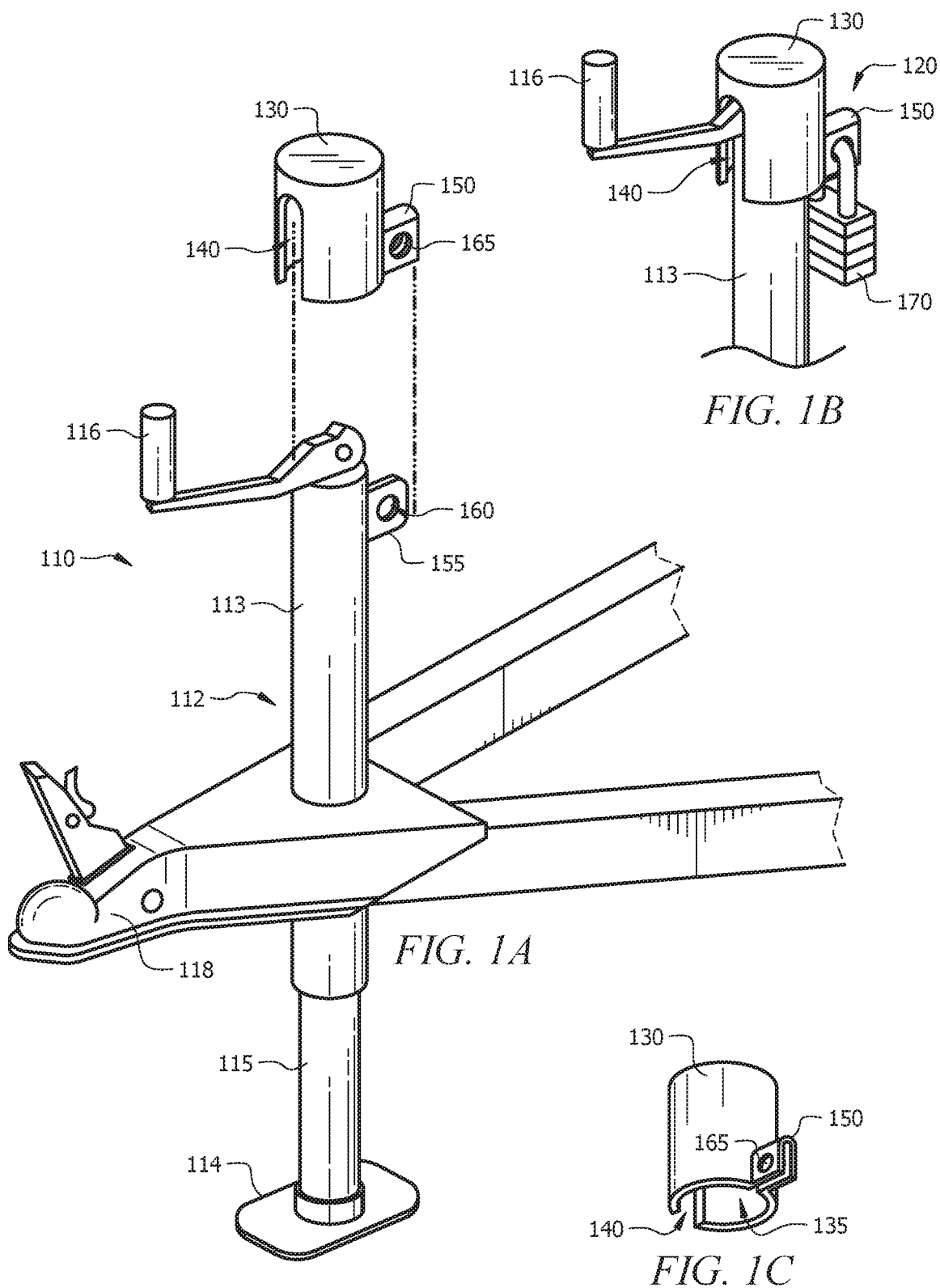

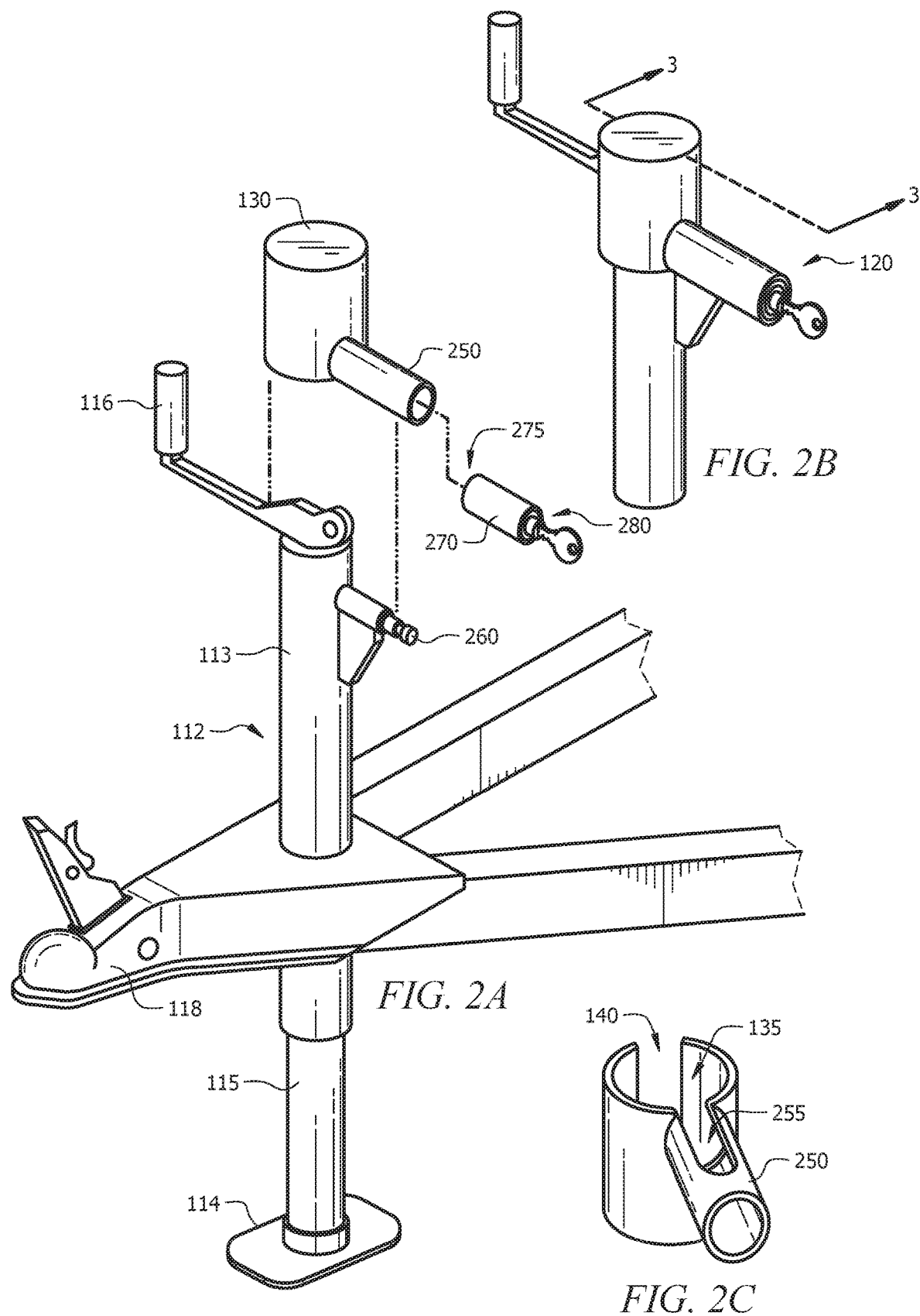

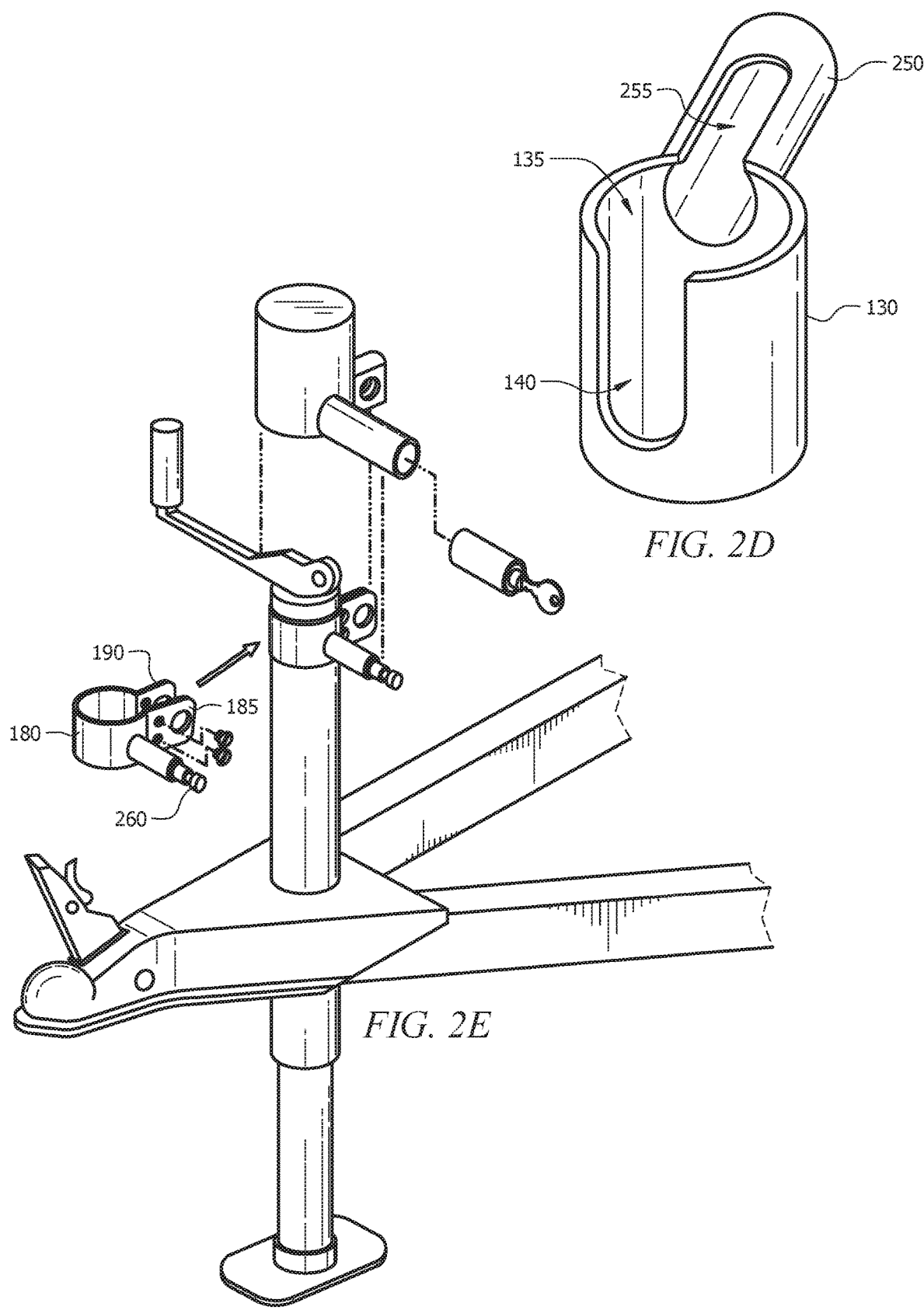

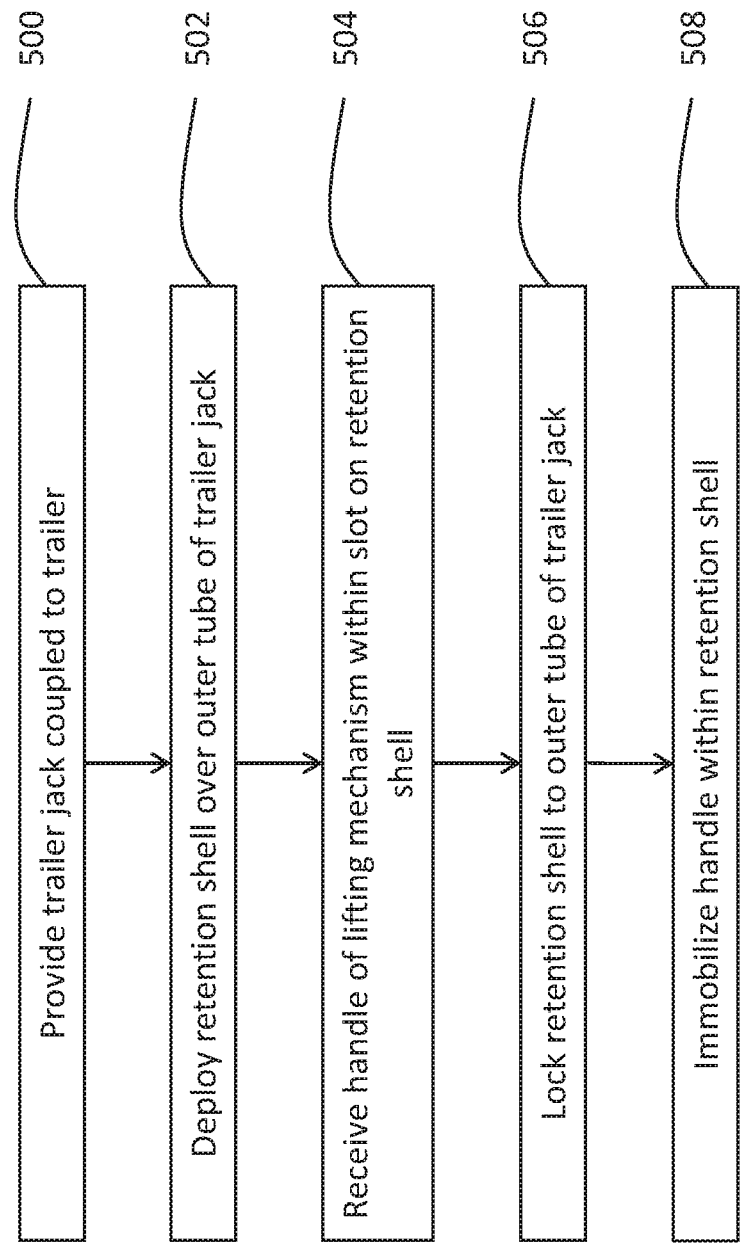

DETACHABLE TRAILER JACK LOCKING ASSEMBLY

BACKGROUND OF THE INVENTION

1. Field of the Invention

This invention relates, generally, to a locking assembly for use with a trailer jack or jack stand. More specifically, it relates to a detachable locking assembly for a trailer jack or jack stand that prevents the theft of a trailer, boat, vehicle, or other towable structure.

2. Brief Description of the Prior Art

Trailers, boats, vehicles, and other towable structures often couple to a truck or towing vehicle via a trailer hitch. Upon arrival at a destination, the trailer is often detached from the truck—for example, a trailer may be parked in a driveway and detached from the truck, such that the truck may be used separate from the trailer. To prevent the trailer from tipping over or rolling away when parked, a trailer jack or jack stand is often used to balance the trailer on a ground surface, cement block, or other stable surface.

Typical trailer jacks consist of few component parts—a base, a body, and a handle to raise and lower the body by rotational or pumping movement. Due to their simplicity, many trailer jacks do not include a locking mechanism to prevent the theft or unauthorized use of the trailer. Moreover, lockable trailer jacks often include a U-lock, padlock, or other type of a simple lock. These locks act as a deterrent to the theft of the trailer. However, such simplistic locks offer weak theft protection, because they can be easily removed via a lock pick or a bolt-cutter. Further, even when these locks are deployed, they may not disable the use of the lifting mechanism. As such, the trailer jack can be lifted and the trailer can be stolen by an unauthorized user. Accordingly, even when the trailer jack includes a conventional lock, trailer theft is a widespread and commonly-occurring problem, particularly in coastal locations and boating communities.

Attempts have been made to introduce complex locks to prevent trailer theft. For example, U.S. Pat. No. 7,584,677 adds a keyed locking mechanism on top of a screw jack to prevent trailer theft. The '677 Patent teaches the addition of an outer sleeve, including a handle that can be rendered inoperable by using the key. However, the handle of the '677 Patent can be removed, and the lifting mechanism can be reached by a pair of pliers, bypassing the locking mechanism and leading to trailer theft. Similarly, U.S. Pat. No. 9,393,936 discloses a lock housed within a box aimed at deterring trailer theft. However, the '936 Patent requires the modification of the structure of a trailer jack in order to be operable. Such permanent modification is undesirable for both practical and legal reasons. An amateur may be unable to modify a mechanical structure, such as a trailer jack. Permanent modification may be dangerous if improperly performed, since the trailer could detach from the towing vehicle while the towing vehicle is in motion. In addition, permanent modification can void a product warranty. Finally, while complex locks may be used to prevent trailer theft, these locks are not easily removable when not in use.

Accordingly, what is needed is a detachable trailer jack locking assembly that prevents the theft of the trailer and does not require a permanent modification of a trailer jack or stand. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a detachable trailer jack locking assembly, including at least a cap and a lock, that prevents the theft of a trailer is now met by a new, useful, and nonobvious invention.

The novel structure is configured to be used in combination with a trailer jack having a base, a body including an outer tube in a telescoping relationship with an inner tube, and a lifting mechanism operated via a handle for raising and lowing the outer tube with respect to the base. The locking assembly includes a retention shell having a lateral wall partially enclosing a central cavity. The retention shell is configured to surmount an upper end of the outer tube of the trailer jack. The central cavity accepts the upper end of the outer tube. The retention shell complements a cross-sectional shape of the upper end of the outer tube. The cross-sectional shape may be elliptical, polygonal, and a combination thereof. A slot is disposed within the lateral wall of the retention shell. The slot is configured to accept the handle via which the lifting mechanism of the trailer jack is operated. A bracket is disposed on the retention shell and axially extends in a direction away from the central cavity. A channel is disposed on the bracket and is open to the central cavity.

An attachment member is affixed to the outer tube of the trailer jack body and extends away therefrom. The attachment member may be a pin or a staple. The bracket of the retention shell is configured to accept the attachment member via the channel when the retention shell is deployed over the outer tube. If the attachment member is a staple including an eyelet hole, the bracket surmounts the staple. The bracket includes an aperture that is configured to align with the eyelet hole. If the attachment member is a pin, the bracket is a shaft that is configured to accept the pin via the channel.

The attachment member may reside on a clamp. The clamp is configured to be clamped onto the outer tube of the trailer jack, thereby affixing the attachment member to the outer tube. The clamp fastens against the outer tube when a first end of the clamp mates with a second end of the clamp. The central cavity of the retention shell is sized and shaped to receive the clamp in addition to the upper end of the outer tube.

The locking assembly also includes a lock. The lock is configured to reside within the bracket of the retention shell. The lock is also configured to engage the attachment member. In a locked configuration, the lock secures against the attachment member. In the locked configuration, the lock is secured against removal from the bracket. In an unlocked configuration, the lock releases the attachment member. If the attachment member is the staple, the lock includes a shackle. The shackle is configured to be inserted though both the aperture on the bracket and the eyelet hole on the staple. If the attachment member is the pin, the lock is a cylinder lock. The cylinder lock is adapted to sheathe the pin. In the locked configuration, the cylinder lock retains the pin. In the unlocked configuration, the cylinder lock releases the pin. When locked, the retention shell is secured in a deployed position. In the deployed position, the retention shell immobilizes the handle of the lifting mechanism, rendering the lifting mechanism inoperable.

In an embodiment of the locking assembly, the bracket coupled to the lateral wall of the retention shell includes a first wall opposite a second wall. The channel open to the central cavity is formed between the first and second walls. The bracket and the slot are configured to receive the handle of the lifting mechanism, which includes a shaft and an elbow. The first and second walls are mechanically coupled via an end wall, forming a U-shaped bracket. The end wall is longitudinally-spaced from the slot disposed within the retention shell. The first and second walls are sized such that the handle of the lifting mechanism rests against the end wall when the retention shell is deployed over the outer tube of the trailer jack.

A lock engages with the bracket, with the lock being configured to secure the retention shell against removal from the outer tube of the trailer jack. The lock includes a shackle configured to reside within a space partially defined by the elbow and the shaft of the handle, and an upper surface of the bracket. In a locked configuration, the lock secures the retention shell against the trailer jack by immobilizing the handle of the lifting mechanism. In the locked configuration, the lock is secured against removal from the locking assembly.

A method of locking a trailer jack is presented by the present invention. The method includes the step of providing a trailer jack coupled to a trailer. A retention shell surmounts an upper end of the outer tube of the trailer jack, such that a central cavity of the retention shell accepts the upper end of the outer tube. The handle of the lifting mechanism is received within a slot disposed within a lateral wall of the retention shell. The retention shell is secured against the outer tube of the trailer jack via a lock. The lock is configured to engage with a bracket of the retention shell.

An object of the invention is to provide a locking cap that is configured to be installed on a trailer jack without the need for complex modifications or professional tools. The locking cap easily couples to and secures the trailer jack. As a result, the invention serves as a theft deterrent for trailer jacks, making it difficult for a thief to break through the locking assembly.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1A is an exploded view of a trailer jack locking assembly used in combination with a trailer jack.

FIG. 1B is a perspective view of the trailer jack locking assembly of FIG. 1A including a lock.

FIG. 1C is a perspective view the trailer jack locking assembly of FIG. 1A, depicting a retention shell.

FIG. 2A is an exploded view of an embodiment of a trailer jack locking assembly including a cantilever pin.

FIG. 2B is a perspective view of the trailer jack locking assembly of FIG. 2A, depicting the use of a cylinder lock.

FIG. 2C is a perspective view of the trailer jack locking assembly of FIG. 2A, depicting a retention shell.

FIG. 2D is a perspective view of a bottom portion of the retention shell, depicting a central cavity, a slot, and a bracket that can be combined with a cylinder lock.

FIG. 2E is an exploded view of an embodiment of a trailer jack locking assembly including a clamp and a cantilever pin.

FIG. 5 is a flow chart diagram of a method of locking a trailer jack.

DETAILED DESCRIPTION OF THE INVENTION

Figure 1D:
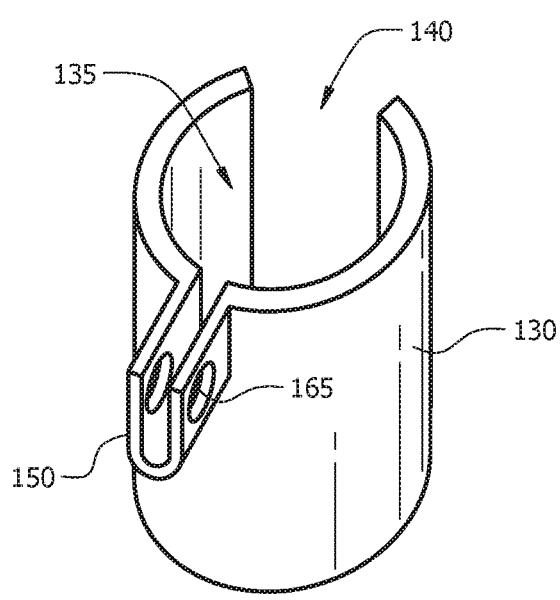
FIG. 1D is a perspective view of a bottom portion of the retention shell, depicting a central cavity, a slot, and a bracket that can be combined with a lock.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Trailer jacks are widely used to stabilize trailers while they are not in use (i.e., when trailers are being stored, as opposed to be used to transport objects). However, trailer jacks do not often include a locking mechanism, thereby inviting theft or unwanted use. The locking assembly of the present invention is adapted to secure against a trailer jack, rendering the trailer jack inoperable when a lock is engaged. The locking assembly includes a retention shell sized and shaped to tightly receive a trailer jack body, and a staple coupled to the retention shell. When a lock couples with the staple, the retention shell is secured against the trailer jack, and a thief cannot easily remove the locking assembly to steal the trailer jack.

The present invention includes a detachable locking assembly used in combination with a trailer jack. As shown in FIG. 1A, a conventional trailer jack 110 includes a telescoping body 112, which couples to a trailer 118. Body 112 has an outer tube 113 and an inner tube 115. Inner tube 115 has a base 114 configured to engage a support surface. When a trailer is not being towed, base 114 rests on the support surface, such as a ground surface, cement block, or a jack stand, thereby stabilizing the trailer. When trailer 118 is in use, such as during transportation, base 114 is lifted from the support surface to prevent base 114 from dragging along the surface. Because stabilizing surfaces may be displaced at varying heights, body 112 is typically equipped with a lifting mechanism, such as a hydraulic handle, for adjusting the height of body 112 by axially moving outer tube 113 relative to inner tube 115. The lifting mechanism raises and lowers outer tube 113 with respect to base 114, such that base 114 may be disposed on surfaces at varying heights. Trailer jack 110 may be pivotably coupled to trailer 118, or may be affixed perpendicularly to trailer 118, as shown in FIG. 1A.

Continuing reference to FIG. 1A, an embodiment of locking assembly 120 includes a retention shell 130. Retention shell 130 is sized and shaped to complement the size and shape of trailer jack body 112. For example, if body 112 is cylindrical, retention shell 130 is also cylindrical. Similarly, if body 112 is rectangular or polygonal, retention shell 130 is of the same complimentary shape. Retention shell 130 defines a central cavity 135 which receives an upper end of outer tube 113. Central cavity 135 has a diameter or a width that is slightly greater than that of the upper end of outer tube 113 (±0.5 inches). As such, retention shell 130 forms a tight seal when deployed over the upper end of outer tube 113. Central cavity 135 is shown in greater detail in FIGS. 1C and 1D.

The trailer jack includes a lifting mechanism disposed within body 112. A common danger faced by trailer 118 owners is that the lifting mechanism can be used to raise trailer jack 110, thereby disengaging base 114 from a surface. The lifting mechanism axially displaces outer tube 113 with respect to inner tube 115, which remains stationary. The lifting mechanism may be a hydraulic mechanism, a threaded lifting mechanism, or another mechanism for axially displacing two telescoping components known in the art. The lifting mechanism is operated via a handle 116. To adjust the height of the trailer jack, the handle is either rotated in a horizontal plane and/or lifted in a vertical plane.

When handle 116 is left unsecured, a thief or other unauthorized user can operate the lifting mechanism to lift base 114 off the ground and abscond with the trailer. To prevent this from happening, retention shell 130 immobilizes handle 116, thereby rendering the lifting mechanism inoperable. Retention shell 130 includes a slot 140, which is depicted in FIG. 1D. Slot 140 is sized and shaped to receive handle 116. When retention shell 130 is deployed over the upper end of outer tube 113, handle 116 resides within slot 140. The wall of slot 140 immobilizes handle 116 against movement in both horizontal and vertical planes, such as rotational or pump movement, thereby rending the lifting mechanism inoperable. Because operation of the lifting is required to raise body 112 of trailer jack 110, the inoperability of the lifting mechanism prevents unauthorized use of trailer jack 110.

Some trailer jacks include a staple 155, as shown in FIG. 1A. Staple 155 is disposed on trailer jack 110, such as on body 112. In an embodiment, retention shell 130 includes bracket 150, which couples with staple 155 and provides an attachment point for lock 170. Bracket 150, central cavity 135, and slot 140 are shown in greater detail in FIG. 1D.

Bracket 150 extends in a direction away from central cavity 135. Bracket 150 includes a channel disposed thereon, the channel being open to central cavity 135. Bracket 150 is sized and shaped to mate with and surmount staple 155 through the channel. The shape of bracket 150 depends on the shape of staple 155. As shown in FIG. 1A, staple 155 has an eyelet hole 160. Bracket 150 has an aperture 165 configured to align with eyelet hole 160 when retention shell 130 is deployed over the upper end of outer tube 113 of jack 110. When the central axes of aperture 165 and eyelet hole 160 align, shackle of lock 170 can be inserted through both aperture 165 and eyelet hole 160, as shown in FIG. 1B. Thus, lock 170 secures retention shell 130 against trailer jack 110. When lock 170 is locked, the lifting mechanism of trailer jack 110 is inoperable because handle 116 is immobilized within slot 140 of retention shell 130. While lock 170 is shown as a padlock, it is appreciated that other locks may be used.

Figure 1E:
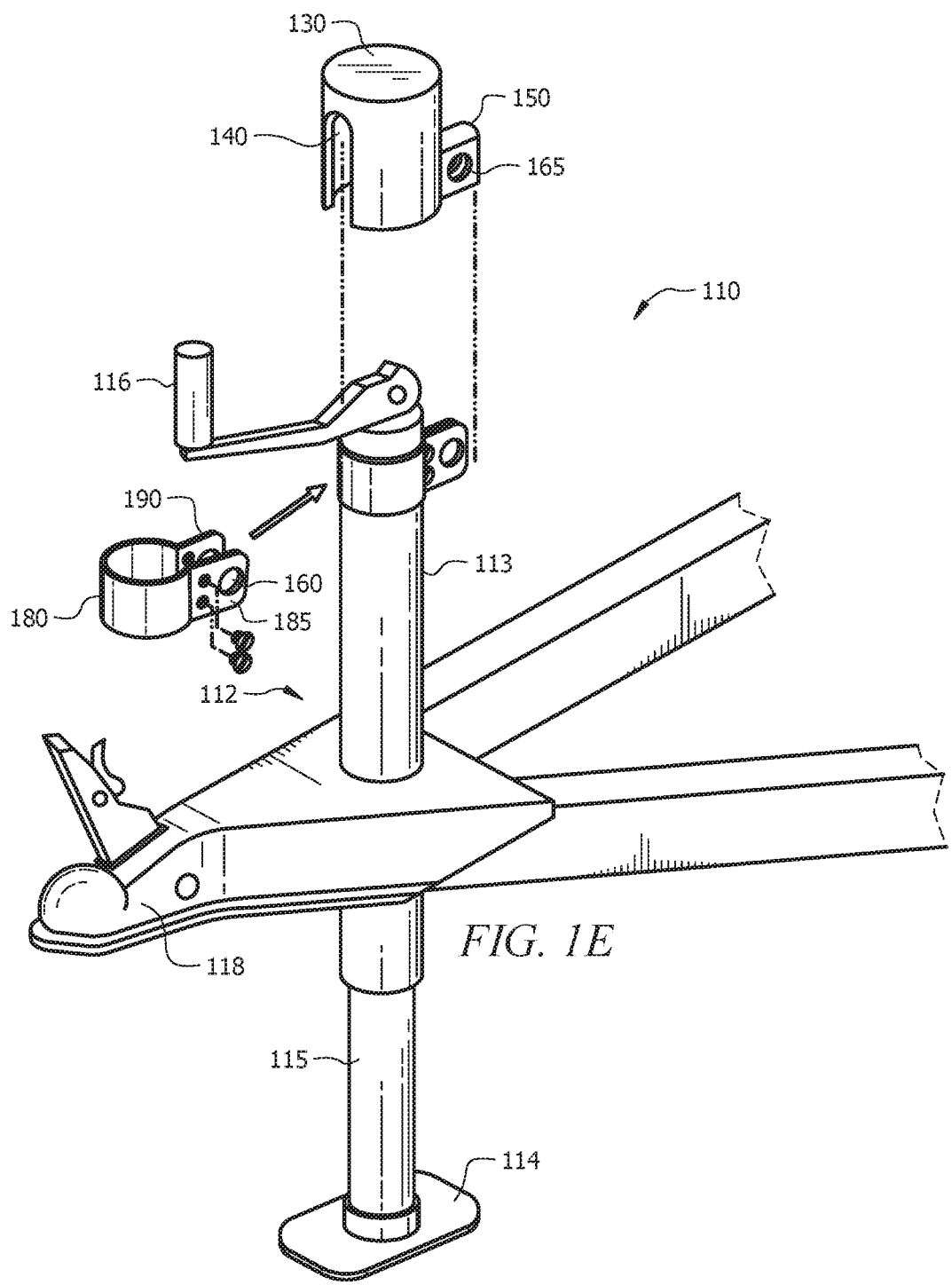
FIG. 1E is an exploded view of an embodiment of a trailer jack locking assembly including a clamp.

As shown in FIG. 1E, staple 155 may reside on a clamp 180. Clamp 180 includes a first end 185 and a second end 190. Clamp 180 is affixed to body 112 of trailer jack 110. For example, first end 185 attaches to second end 190 through one or more screws, pins, bolts, clamps, rivets, adhesives, or any other means known in the art for securing two surfaces in a mating engagement.

FIG. 2A depicts an alternative embodiment of locking assembly 120. Instead of a staple, a cantilevered pin 260 is affixed to the upper end of outer tube 113. Staple 155 and pin 260 are attachment members. Pin 260 extends in a direction away from body 112 of trailer jack 110. To couple with pin 260, retention shell 130 includes shaft 250, which is similar in use to bracket 150. Shaft 250 is an extension that projects in a direction away from retention shell 130. Shaft 250 is sized and shaped to mate with and substantially surmount pin 260. Shaft 250 includes channel 255 disposed on a bottom surface thereof. Channel 255 is open to central cavity 135. Shaft 250 is configured to accept pin 260 via channel 255 when retention shell 130 is being deployed over outer tube 113. As shown in FIG. 2A, shaft 250 prevents access to pin 260 from the top and the bottom of pin 260, only allowing pin 260 to be accessed through shaft 250. As shown in FIG. 2E, pin 260 may be formed on clamp 180. This allows a user to temporarily modify a trailer jack without the need for permanent modification.

Figure 3:
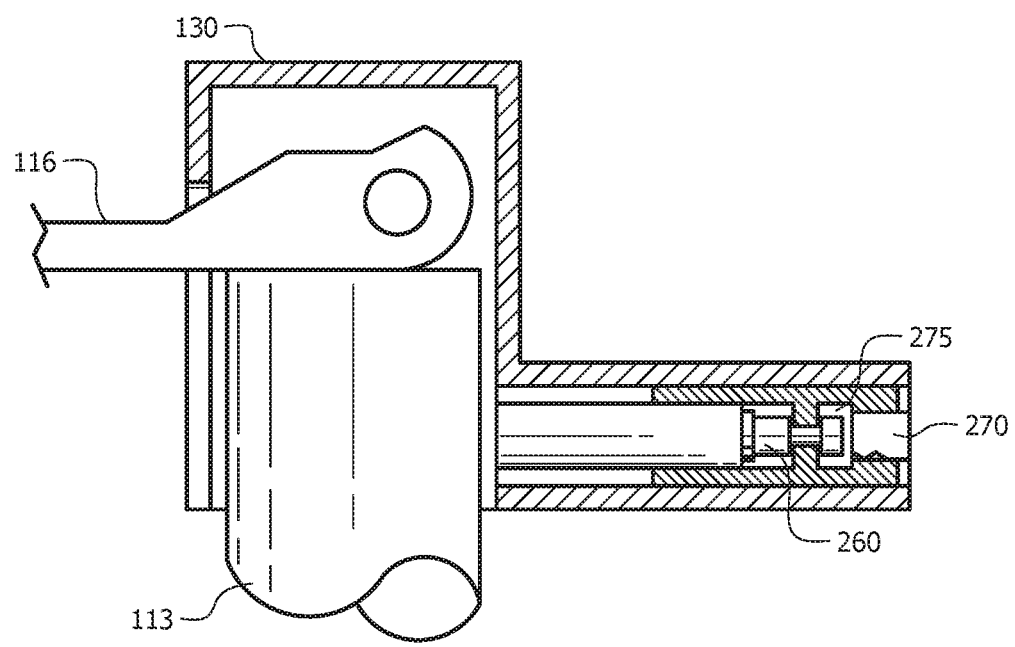
FIG. 3 is a section view of a cylinder lock coupled to a pin on a trailer jack along section line 3 of FIG. 2B.

As shown in FIG. 2B, to secure retention shell 130 against trailer jack 110, locking assembly 120 includes lock 170. To be insertable within shaft 150, lock 170 is a cylinder lock 270. Cylinder lock 270 includes a first end 275 and a second end 280. First end 275 is sized and shaped to engage with pin 260 when cylinder lock 270 is inserted within shaft 250. Second end 280 provides for the insertion of a key to engage and disengage lock 270. The operation of second end 280 controls first end 275. For example, when a key is inserted within second end 280 to engage cylinder lock 270, first end 275 secures against pin 260. In a locked configuration, cylinder lock 270 retains pin 260. In the locked configuration, the lifting mechanism of trailer jack 110 is operable because handle 116 is immobilized within slot 140 of retention shell 130. In an unlocked configuration, cylinder lock 270 released pin 260. The interaction between first end 275 and pin 260 is depicted in FIG. 3, which is a section view of the mechanics within shaft 250.

Figure 4A:
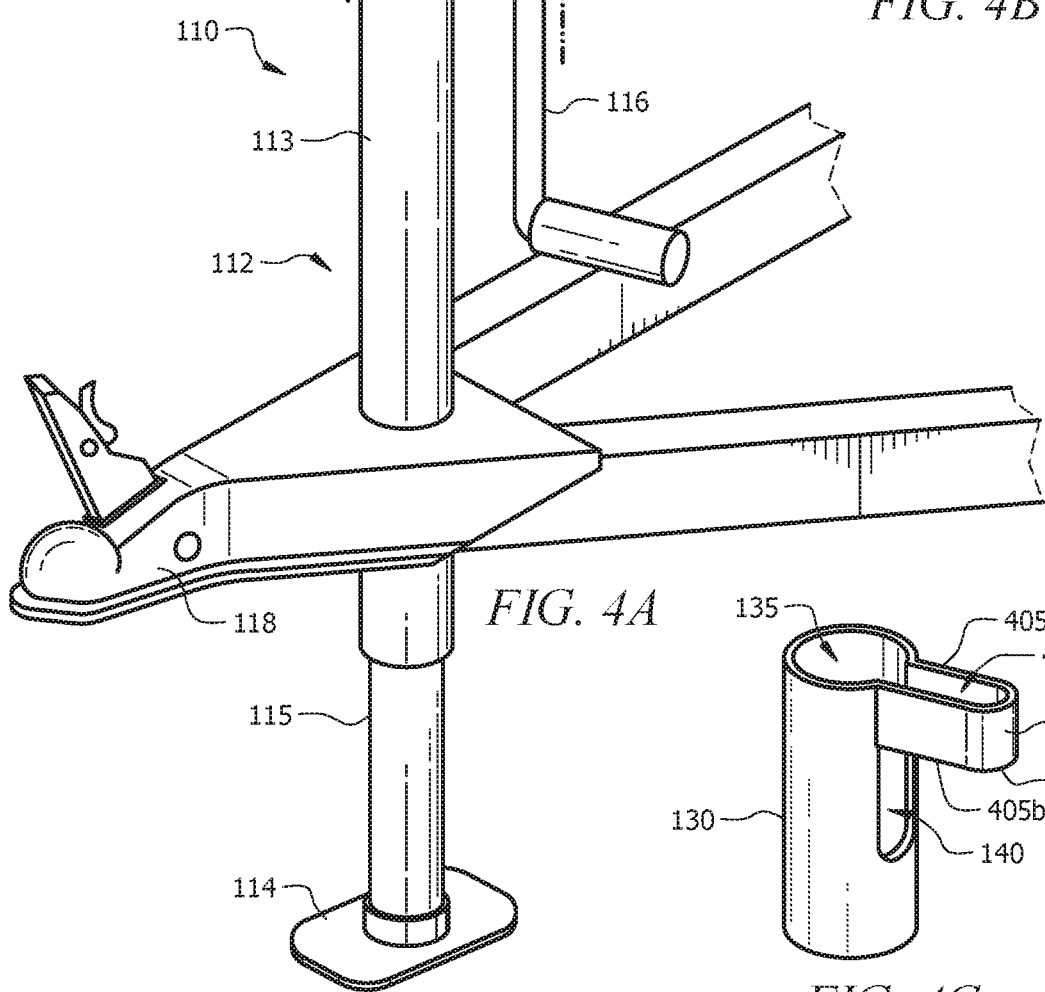
FIG. 4A is an exploded view of a trailer jack locking assembly used in combination with a trailer jack.
Figure 4B:
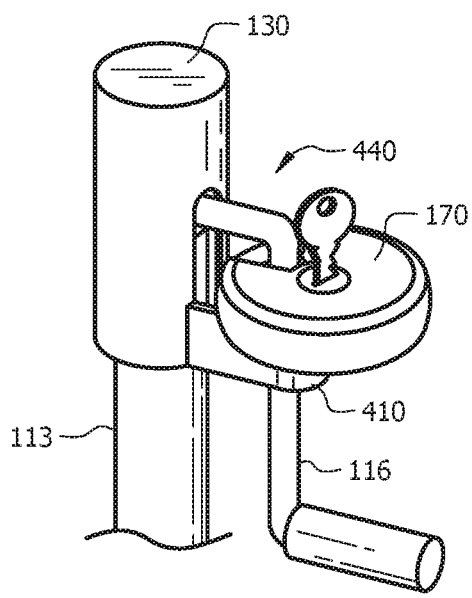
FIG. 4B is a perspective view of the trailer jack locking assembly of FIG. 4A, including a lock.
Figure 4C:
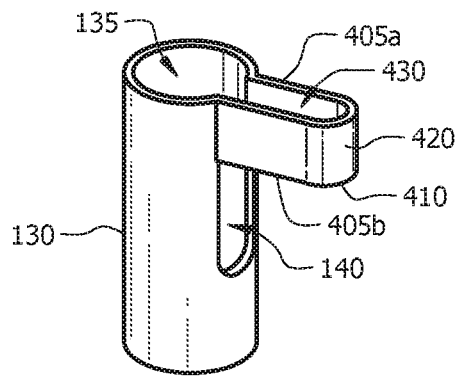
FIG. 4C is a perspective view of the trailer jack locking assembly of FIG. 4A, depicting an embodiment of a retention shell.

FIGS. 4A-4C depict an embodiment of a locking assembly, generally denoted by reference numeral 440, is depicted. Locking assembly 440 includes retention shell 130, which is used to immobilize trailer jack handle 116. Handle 116 includes an elbow and a shaft, the shaft being coupled to outer tube 1113 of trailer jack 110. Retention shell 130 includes bracket 420. Bracket 410 is coupled to a lateral wall of retention shell 130, and axially extends away from slot 140. Bracket 410 includes first wall 405a opposite second wall 405b, which form channel 430. Channel 430 is open to central cavity 135 of retention shell 130. Channel 430 is disposed to accept the shaft of handle 116. As such, channel 430 and slot 140 are configured to accept both the shaft and the elbow of handle 116 when retention shell 130 is deployed over outer tube 113 of trailer jack 110.

First and second walls 405a, 405b are mechanically coupled through end wall 420, forming a U-shaped bracket. End wall 420 is longitudinally-spaced from slot 140. First and second walls 405a, 405b are sized such that a portion of handle 116 rests against end wall 420 when retention shell 120 is deployed over outer tube 113 of trailer jack 110. As such, end wall 420 is adapted to prevent access to handle 116.

Referring in particular to FIG. 4B, the coupling of lock 170 to retention shell 130 and handle 116 is shown in detail. The elbow and shaft of handle 116, together with an upper surface of bracket 410, partially define a space. A shackle on lock 170 is configured to reside with the space partially defined by the elbow and shaft of handle 116 and the upper surface of bracket 410.

Lock 170 includes a locked configuration, in which lock 170 retains retention shell 130 against outer tube 113 of trailer jack 110. In the locked configuration, lock 170 is secured against removal from locking assembly 440. Lock 170 is adapted to immobilize handle 116 against bracket 410 and retention shell 130. As such, lock 170 engages bracket 410, with lock 170 being configured to secure retention shell 130 against removal from outer tube 113. When lock 170 attaches to handle 116 and retention shell 130, lock 170 substantially prevents handle 116 from translation, thereby acting as a theft deterrent.

Referring now to FIG. 5, in conjunction with FIGS. 1A-4C, an exemplary process-flow diagram is provided, depicting a method of locking a trailer jack. The steps delineated in the exemplary process-flow diagram of FIG. 5 are merely exemplary of a preferred order of securing a retention shell against a trailer jack. The steps may be carried out in another order, with or without additional steps included therein. Additionally, the steps may be carried out with an alternative embodiment of locking assembly 120, as contemplated in the description above.

The method of locking a trailer jack begins at step 500, during which a trailer jack 110 is provided, which includes the components discussed above. The method then proceeds to step 502, in which retention shell 130 is deployed over outer tube 113 on trailer jack 110. Retention shell 130 surmounts the upper end of outer tube 113. The upper end of outer tube 113 is thereby housed within central cavity 135. Retention shell 130 includes an inner diameter than is slightly greater than an outer diameter of the upper end of outer tube 113. As such, retention shell 130 forms a tight seal with the upper end of outer tube 113. When retention shell 130 surmounts the upper end of the outer tube 113, a portion of handle 116 is received within slot 140 on retention wall 130. The receipt of handle 116 within slot 140 occurs during step 504.

Once retention shell 130 receives the upper end of outer tube 113, trailer jack 110 must be locked to disable the functionality of trailer jack 110, thereby preventing theft. As such, lock 170 is utilized to secure retention shell 130 to outer tube 113 during step 506. If retention shell 130 includes bracket 410, as depicted in FIGS. 4A-4B, lock 170 engages with bracket 410 to secure retention shell 130 against trailer jack 110. Alternatively, if trailer jack 110 includes staple 155, and retention shell includes bracket 150, as depicted in FIGS. 1A-1B, lock 170 is adapted to be inserted through staple 155 and bracket 150 to secure retention shell 130 against trailer jack 110. Regardless of the locking mechanism, the method proceeds to step 508, during which handle 116 is immobilized within retention shell 130, particularly within slot 140. As such, handle 116 is prevented from translation, and the lifting mechanism of trailer jack 110 cannot be utilized to raise and lower outer tube 113 with respect to base 114 of trailer jack 110.

Glossary of Claim Terms

Attachment member: is a receipt for a lock. The attachment member may be either male or female, depending on the orientation of the lock.

Bracket: is a component of a retention shell that may receive a lock.

Clamp: is a piece of material that can surround and fasten against a structure.

Cylinder lock: is a lock that is insertable within a female receipt, such as a bracket.

Lock: is a device configured to securely retain or couple two components together. For example, the lock may be a padlock, such as a U-lock or other similarly-shaped lock, including a shackle that can pass through an aperture to secure two structures together. The lock may alternatively be a cylinder lock.

Retention shell: is a cap including a central cavity that is sized and shaped to receive an upper end of an outer tube of a trailer jack.

Staple: is an attachment point for a padlock including one or more apertures. The staple is sized and shaped to be surmounted by a bracket, and the aperture is sized and shaped to receive the shackle of the padlock.

Trailer jack: is a mechanism that provides for the raising and lowering of a trailer or similar structure.

REFERENCES

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A locking assembly for use in combination with a trailer jack, the trailer jack having a base, a body including an outer tube in a telescoping relationship with an inner tube, and a lifting mechanism operated via a handle for raising and lowering the outer tube with respect to the base, the handle having an elbow and a shaft coupled to the outer tube of the body, the locking assembly comprising:
   a retention shell having a continuous lateral wall orthogonally connected to an upper wall, the retention shell partially enclosing a central cavity, the retention shell configured to surmount an upper end of the outer tube of the trailer jack, whereby the central cavity accepts the upper end of the outer tube;
   a slot disposed within the lateral wall of the retention shell, the slot configured to accept the handle via which the lifting mechanism of the trailer jack is operated;
   a bracket coupled to the lateral wall of the retention shell and radially extending away from the slot, the bracket including a first wall opposite a second wall, the first and second walls being disposed on opposite sides of the slot whereby a channel is formed between the first and second walls, the channel opening to the slot, wherein the bracket is configured to accept the shaft of the handle into the channel between the first and second walls when the retention shell is deployed over the outer tube, thereby immobilizing the handle; and
   a lock engaging the bracket, the lock configured to secure the retention shell against removal from the outer tube;
   whereby when the retention shell is deployed over the outer tube of the trailer jack, the bracket immobilizes the handle of the lifting mechanism, thereby rendering the lifting mechanism of the trailer jack inoperable.

2. The locking assembly of claim 1, wherein:
   the bracket further comprises an end wall connecting the first wall and the second wall, thereby forming a U-shaped bracket.

3. The locking assembly of claim 2, wherein:
   the first and second walls of the U-shaped bracket are sized such that the handle rests against the end wall when the retention shell is deployed over the outer tube of the trailer jack.

4. The locking assembly of claim 1, wherein:
   the lock has a shackle configured to reside within a space partially defined by the elbow and the shaft of the handle and an upper surface of the bracket.

5. A locking assembly for use in combination with a trailer jack, the trailer jack having a base, a body including an outer tube in a telescoping relationship with an inner tube, and a lifting mechanism operated via a handle for raising and lowering the outer tube with respect to the base, the locking assembly comprising:
   an attachment member affixed to the outer tube of the trailer jack body and extending away therefrom, the attachment member selected from the group consisting of a pin and a staple;
   a retention shell having a continuous lateral wall orthogonally connected to an upper wall, the retention shell partially enclosing a central cavity, the retention shell configured to surmount an upper end of the outer tube of the trailer jack, whereby the central cavity accepts the upper end of the outer tube;
   a slot disposed within the lateral wall of the retention shell, the slot configured to accept the handle via which the lifting mechanism of the trailer jack is operated;
   a bracket disposed on the retention shell and extending in a direction away from the central cavity, the bracket having a channel disposed thereon, the channel being open to the central cavity, the bracket configured to accept the attachment member via the channel when the retention shell is being deployed over the outer tube; and
   a lock configured to reside within the bracket of the retention shell, the lock configured to engage the attachment member, the locking having a locked configuration in which the lock secures against the attachment member and an unlocked configuration in which the lock releases the attachment member, whereby when the lock is in the locked configuration, the lock is secured against removal from the bracket;
   whereby when the retention shell is deployed over the outer tube of the trailer jack, the slot within the lateral wall of the retention shell immobilizes the handle of the lifting mechanism, thereby rendering the lifting mechanism of the trailer jack inoperable.

6. The locking assembly of claim 5, wherein:
   the attachment member is the staple including an eyelet hole; and
   the bracket surmounts the staple and includes an aperture that is configured to align with the eyelet hole when the retention shell is being deployed over the upper end of the outer tube of the trailer jack.

7. The locking assembly of claim 6, wherein:
   the lock includes a shackle configured to be inserted through both the aperture and the eyelet hole, thereby securing the retention shell to the trailer jack when locked, immobilizing the handle within the slot.

8. The locking assembly of claim 5, wherein:
   the attachment member is a pin, and the bracket is configured to accept the pin via the channel of the bracket when the retention shell is being deployed over the upper end of the outer tube of the trailer jack.

9. The locking assembly of claim 8, wherein:
   the lock is a cylinder lock adapted to sheathe the pin, retain the pin in the locked configuration, and release the pin the in unlocked configuration, thereby securing the retention shell in a deployed position when the lock is in the locked configuration.

10. The locking assembly of claim 5, wherein:
    the attachment member resides on a clamp, the clamp configured to clamp onto the outer tube of the trailer jack, thereby affixing the attachment member to the outer tube of the trailer jack body.

11. The locking assembly of claim 10, wherein:
    a first end of the clamp is mated with a second end of the clamp, thereby fastening the clamp to the outer tube.

12. A method of locking a trailer jack comprising:
    providing a trailer jack coupled to a trailer, the trailer jack having a base, a body including an outer tube in a telescoping relationship with an inner tube, and a lifting mechanism operated via a handle for raising and lowering the outer tube with respect to the base, the handle coupled to the outer tube of the body;
    surmounting an upper end of the outer tube of the trailer jack with a retention shell, the retention shell having a continuous lateral wall orthogonally connected to an upper wall, the retention shell partially enclosing a central cavity, a slot disposed within the lateral wall, and a bracket coupled to the lateral wall and axially extending away from the slot, the bracket having a channel being open to the central cavity, whereby the central cavity accepts the upper end of the outer tube;

receiving the handle of the lifting mechanism within the slot disposed within the lateral wall of the retention shell;

locking the retention shell to the outer tube of the trailer jack via a lock engaging the bracket, the lock having a locked configuration in which the lock retains the retention shell against removal from the outer tube of the trailer jack.

13. The method of claim 12, wherein:
the bracket includes a first wall opposite a second wall, the bracket configured to accept a shaft of the handle into the channel between the first and the second walls.

14. The method of claim 12, wherein:
the bracket is a U-shaped bracket.

15. The method of claim 14, wherein:
the U-shaped bracket is sized such that a shaft of the handle rests against an end wall of the bracket when the retention shell is deployed over the outer tube of the trailer jack.

16. The method of claim 12, wherein:
the lock has a shackle configured to reside within a space partially defined by an elbow and a shaft of the handle and an upper surface of the bracket.

17. The method of claim 12, wherein:
the trailer jack includes a staple affixed to the outer tube of the trailer jack body and extending away therefrom, the staple including an eyelet hole; and the bracket surmounts the staple and includes an aperture that is configured to align with the eyelet hole when the retention shell is being deployed over the upper end of the outer tube of the trailer jack.

18. The method of claim 17, wherein:
the lock includes a shackle configured to be inserted through both the aperture and the eyelet hole, thereby securing the retention shell to the trailer jack when locked, immobilizing the handle within the slot.

* * * * *